United States Patent [19]

Hanley

[11] 4,166,222

[45] Aug. 28, 1979

[54] WIND WHEEL APPARATUS FOR USE WITH A HYDRO-ELECTRIC DAM

[76] Inventor: John Hanley, P.O. Box 1423, Conrad, Mont. 59425

[21] Appl. No.: 850,012

[22] Filed: Nov. 9, 1977

[51] Int. Cl.$^2$ ............................................. F03D 9/00
[52] U.S. Cl. ........................................ 290/55; 60/398; 415/2; 416/123
[58] Field of Search ............... 290/52, 44, 55; 415/2; 60/398, 413; 416/122, 123; 417/334

[56] References Cited

U.S. PATENT DOCUMENTS 4,117,676  10/1978  Atencio .................................. 290/52

FOREIGN PATENT DOCUMENTS 500360  1/1952  France ........................................ 60/398
430101  2/1948  Italy ............................................. 415/2

*Primary Examiner*—Gene Z. Rubinson
*Assistant Examiner*—Morris Ginsburg
*Attorney, Agent, or Firm*—Victor J. Evans & Co.

[57] ABSTRACT

Disclosed herein is an apparatus for fashioning a wind wheel apparatus that utilizes the wheat field principle in association with a power generating station to provide back pumping in a dam environment to provide a greater efficiency. Specifically, a double array of wind wheels is disposed in a matrix on the horizontal plane oriented to address the angle of attack of the wind regardless of wind direction and is further provided with means to develop electrical current therefrom to be used in motivating pumping means for returning water that has generated electricity due to potential energy back into a reservoir. Thus the wind energy is stored in the reservoir as potential energy. Because of its low cost and abundance this energy is able to address the task of supplying energy to industries or municipalities engaged in processing and pumping of large quantities of ocean water to any desirable elevation.

7 Claims, 4 Drawing Figures

4,166,222

WIND WHEEL APPARATUS FOR USE WITH A HYDRO-ELECTRIC DAM

FIELD OF THE INVENTION

This application relates generally to a method and apparatus for taking energy from prevailing winds and converting it into electrical energy that will motivate a pump in association with a dam to return water into the dam from a place below the dam in which the water residing in this lower place has been used to turn hydro-electric generators.

Prior art wind utilizing devices are of the types wherein the windmill is a propeller driven apparatus and the oncoming wind is deflected in direction but slowed in velocity only slightly. Power available from this type of apparatus is limited to about fifty per cent at best and the efficiency varies with the changing wind velocity. Another type of wind utilizing device includes those machines in which the oncoming wind is not deflected but hits the blades surface at right angles thereto thus slowing the wind to the rotational speed of the apparatus. This type achieves limited power transfer because while one blade or member is taking the force of the wind another blade (usually 180 degrees opposite therefrom in an axial sense) around the rotary path is offering almost as much resistance to the wind thereby cancelling most of the power of the blade. Both of these general types are subjected to great damage in bad wind storms. Furthermore both of the above noted types of wind machines are useless for purposes according to the present invention since a plurality of these wind machines must of necessity be relatively small to endure the wind loads imposed thereon and further must be oriented one relative to the other in a spaced relation so that they do not interfere with one another and deprive one wind machine closely disposed to another of the wind itself. That is to say, a tight array of these machines would not be very effective since one machine would work to the detriment of another by virtue of its own wind deflection.

SUMMARY & OBJECT OF THE INVENTION

The present invention overcomes the objections denoted thereinbefore to the use of conventional wind machines since the apparatus according to the present invention defines a plurality of wind machines placed in a matrix or close array that benefits from the action of the wind upon each preceding and proximate wind machine according to the wheat field effect. That is conceptualizing a wheat field as being a plurality of upstanding members all of which react to the force of the wind in parallel or similar manners, it is to be noted that the front or leading edge of a wheat field does not deprive subsequent wheat strands from inter-action with the wind. Similarly, the apparatus according to the present invention benefits from a similar type of effect and allows a plurality of wind generating machines to be placed in a close array or matrix on the horizontal plane to benefit from this wheat field effect.

The benefits derived from the utilization of this principle according to the apparatus to be described hereinbelow further finds utility in the environment of a dam formed by a reservoir and having at the foot of the dam a river or a retrieving pond. Conventional dam structures generally allow the water that is passed through hydroelectric machinery to flow downstream and thereby no longer utilize that water for the benefit of generating further power. However, in accordance with the present invention, this situation can be modified so that a lake or a retrieving reservoir is formed at the foot of the dam and the electricity generated by this horizontal matrix of wind machines generates pumping means which return the water to the dam thereby conserving the amount of water necessary to successfully and efficiently operate the dam and further provides a greater utilization of the water should adverse conditions such as a draught occur and water feeding the dam from the source is no longer available or has been greatly diminished in volume.

Accordingly, one object of this invention is to define a wind machine structure and matrix which allows a greater utilization of the wind's energy per unit area of ground to provide a motive force for pumping means.

The primary object of this invention is to provide an economical energy source capable of addressing the task of processing and pumping to any desirable elevation enormous quantities of water, enough to irrigate large real estate districts and provide the large cities with abundant water, and to accomplish the foregoing at a ground use level of a billion watts or more per square mile for the generating equipment.

A further object contemplates utilizing this pumping means to restock a dam thereby reducing the total amount of water necessary for the maximum efficiency of running this dam.

A further object contemplates providing a series of wind machines in such an array that each wind machine benefits from the inter-action of the wind on the previous machine and therefore more efficiently utilizes the inherent energy in the wind.

A further object contemplates novel means of stationing two arrays of wind machines at right angles to each other, each array accommodating the wind from two cardinal points of the compass.

These and other objects will be made manifest when considering the following detailed specification and appended drawings.

DESCRIPTION OF THE PREFERRED EMBODIMENT

Figure 1:
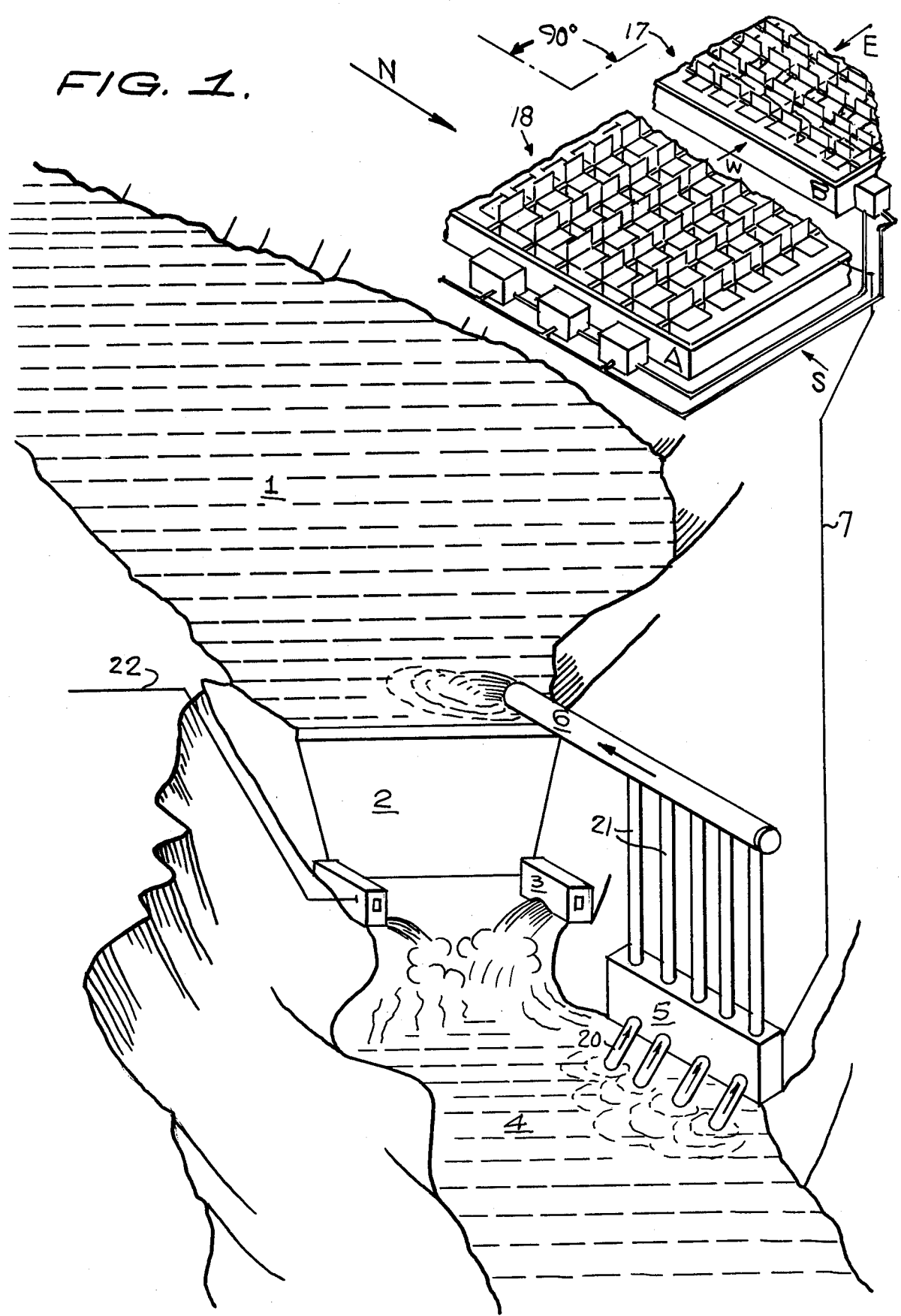
FIG. 1 shows schematic view of the entire dam hydroelectric windwheel operation, Section A oriented to receive winds from North and South, Section B to receive winds from East and West.

Referring to the drawings now wherein like reference numerals refer to like parts throughout, FIG. 1 generally denotes the entire mechanism according to the present invention.

It will be observed from that drawing, that a dam 2 is provided with a water reservoir 1 located at a higher elevation than the retrieving pond 4 and water is caused to flow into pond 4 through hydro-electric generator means 3. This of course is in accordance with conventional dam techniques. However the horizontal array of wind machines denoted by reference numerals 17 and 18 which oriented at 90 degrees relative to each other so that each array rotates in different directions and benefits from wind impinging from two different directions provides a motive force or source which can retrieve water located in area 4 and return it back to the upper reservoir 1. This is possible by converting the wind energy to hydraulic or pneumatic energy which runs from the wind machine arrays 17 and 18 down through line 7 which is preferably a conductor of D.C. electricity to power a pumping station denoted by reference numeral 5. Located therein are water inlets 20 which take water from this lower reservoir 4 and pump it upwardly through conduits 21 thence forward through manifold 6 into the upper reservoir. The energy to be derived in this system shall now be explained and attention is specifically directed to FIGS. 2, 3 and 4 towards that end.

Figure 2:
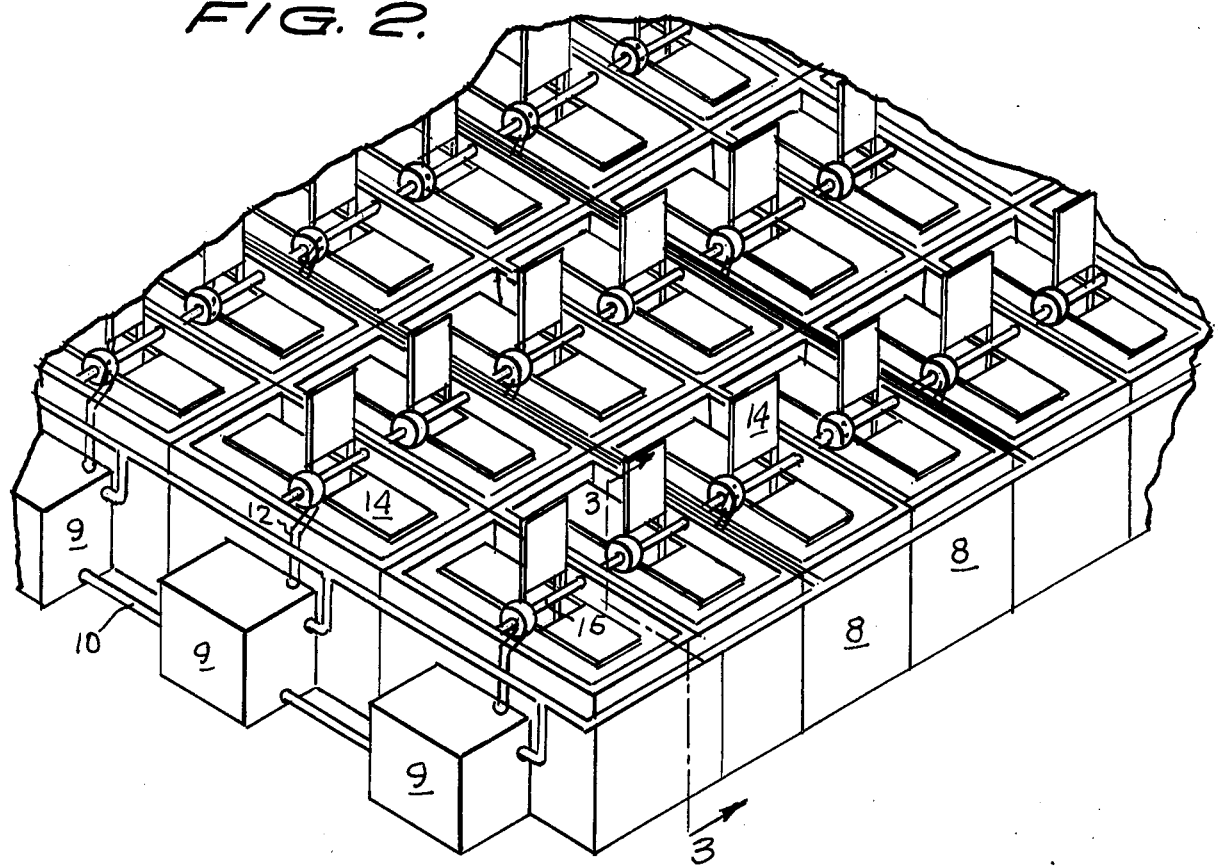
FIG. 2 is a detailed view of the wind machine array matrix and its power output means.
Figure 3:
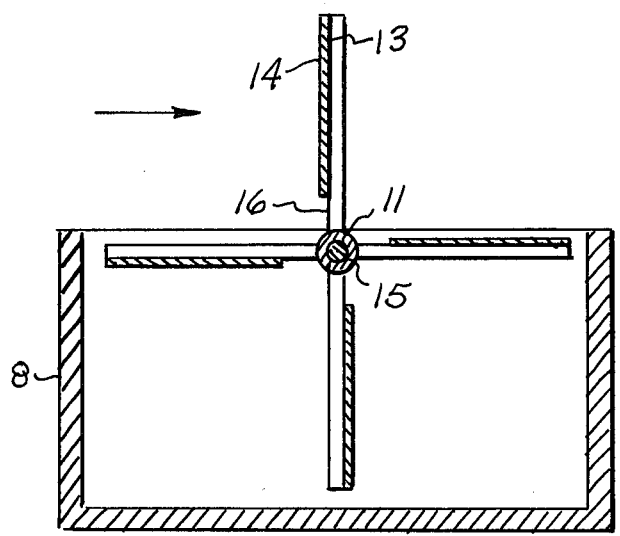
FIG. 3 is a sectional view of the view of FIG. 2 taken along lines 3—3 thereof.
Figure 4:
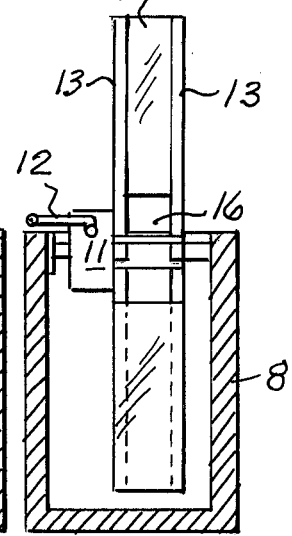
FIG. 4 shows a front view of the individual wind machine element taken in the direction of the arrow denoted in FIG. 3.

FIG. 2 shows a matrix comprised of a plurality of these wind machines and FIGS. 3 and 4 generally denote the manner in which these machines operate. It will be noted from FIGS. 3 and 4 that each wind machine element is comprised of a plurality of wind receiving surfaces or sails 14 supported on a frame network 13 which emanate from a central hub 15 in a manner similar to spokes. Surrounding shaft 15 and offset relative to sails 14 and support members 13 is the means by which the hydraulic or pneumatic energy is generated. This is generally denoted by numeral 11 and a power takeoff is denoted by numeral 12. In practice, this power takeoff may be in the form of a hydraulic pump located within reference numeral 11 in which the functioning of the pump is well known in prior art devices and reference numeral 12 denotes a hydraulic inlet and outlet from which the hydraulic fluid enters and exits. It is to be observed however that sail 14 is interrupted at its lower portion relative to the axle or shaft 15 by an open space 16 which allows impinging wind to pass therethrough so that wind does not deflect downward into the cavity 8 which is of generally rectanguloid shape having an open top portion since deflection in that direction would provide resistance on the efficiency of the turning of these sails due to the effect of the wind running against another sail which would be in the process of rotating upward so that its angle of attack would address the wind in a positive fashion.

It is to be noted that due to the structure as specified above there are inherent benefits since this type of a wind machine can benefit from the wheat field affect discussed above; that is the top most edge of sail 14 and the opening 16 provides a force vector which causes the wind to not be deflected away from the first wind machine that it encounters but rather causes it to be redirected downwardly towards a successive wind machine noted in the array of FIG. 2 that is to say, each successive wind machine denoted therein benefits as much from the wind as the first wind machine of the leading edge of this array. The power takeoff means of FIG. 4 is shown schematically in FIG. 2 as being a hydraulic network denoted by conduits 12 and 10 which communicate with a power converter 9. Power converter 9 consists of a D.C. electric generator and hydraulic or pneumatic motor which is driven by the cumulative hydraulic or pneumatic power output of a plurality of windwheel units. The windwheel matrices may be comprised of a plurality of individual elements each having its own power takeoff.

Having thus described the invention it will be apparent that numerous structural modifications can be contemplated as being a part of this invention within its own scope and spirit as explained above in the specification and as defined below in the appended claims.

What is claimed is:

1. A wind wheel apparatus for converting energy in wind to another form of energy, the apparatus comprising in combination: a plurality of wind machines disposed in a matrix type array such that said wind machines form rows and columns and said wind machines are closely spaced together, each said wind machine is defined by a shaft supported by means defining a cavity, plural pairs of support members extending radially from said shaft, and a sail interposed and extending between said support members defining said each pair, so that at least one of said sails extends above said means defining a cavity, and power takeoff means connected to said shaft, whereby when the wind impinges on said sail that extends above said means defining a cavity said shaft rotates and said power takeoff means converts the shaft rotation to another form of energy.

2. The device of claim 1 in which an opening exists between said sail and said shaft so that wind does not deflect into said means defining said cavity.

3. The device of claim 2 in which there are first and second sets of matrix type arrays of wind machines in which said sails of said first set are orthagonally offset relative to said sails of said second set so as to convert the energy of the wind in all directions.

4. The device of claim 3 in which said power takeoff means is a hydraulic pump which in turn drives a generator.

5. The device of claim 3 in which said power takeoff means is a pneumatic pump which in turn drives a generator.

6. The device of claim 4 in which said generator pumps water through conduit means from a lower level to a higher level which is retained at said higher level by a dam.

7. The device of claim 5 in which said generator pumps water through conduit means from a lower level to a higher level which is retained at said higher level by a dam.

* * * * *